United States Patent
Pace et al.

(10) Patent No.: US 11,580,139 B1
(45) Date of Patent: Feb. 14, 2023

(54) USING AN OBJECT MODEL TO VIEW DATA ASSOCIATED WITH DATA MARKS IN A DATA VISUALIZATION

(71) Applicant: Tableau Software, LLC, Seattle, WA (US)

(72) Inventors: David Pace, Seattle, WA (US); Thomas Nhan, Seattle, WA (US); Jeffrey Mark Booth, Jr., Seattle, WA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 177 days.

(21) Appl. No.: 17/096,869

(22) Filed: Nov. 12, 2020

Related U.S. Application Data

(60) Provisional application No. 62/934,483, filed on Nov. 12, 2019.

(51) Int. Cl.
| | | |
|---|---|---|
| *G06F 16/00* | (2019.01) | |
| *G06F 16/28* | (2019.01) | |
| *G06F 16/242* | (2019.01) | |
| *G06F 16/22* | (2019.01) | |

(52) U.S. Cl.
CPC ........ *G06F 16/287* (2019.01); *G06F 16/2282* (2019.01); *G06F 16/244* (2019.01); *G06F 16/2445* (2019.01)

(58) Field of Classification Search
None
See application file for complete search history.

(56) References Cited

U.S. PATENT DOCUMENTS

| | | | | |
|---|---|---|---|---|
| 2014/0040794 | A1* | 2/2014 | Jones | G06F 16/9535 715/763 |
| 2016/0364093 | A1* | 12/2016 | Denton | G06F 16/26 |
| 2018/0336254 | A1* | 11/2018 | Bergman | G06F 9/5027 |
| 2019/0205453 | A1* | 7/2019 | Miller | G06F 16/2282 |
| 2020/0004865 | A1* | 1/2020 | Dilts | G06F 16/288 |

OTHER PUBLICATIONS

Visualization of Heterogeneous Data, Cammarano et al (Year: 2007).*
A Framework to Analyze Information Visualization , based on the Functional Data Model, Sugibuchi et al. (Year: 2009).*

* cited by examiner

*Primary Examiner* — Augustine K. Obisesan
(74) *Attorney, Agent, or Firm* — Morgan, Lewis & Bockius LLP

(57) ABSTRACT

A computer generates and displays a data visualization in a data visualization user interface according to placement of data fields, from a data source. The data visualization includes visual data marks representing data from the data source. The computer detects a user input to select a visual data mark. In response to detecting the user input, the computer obtains a data model encoding the data source as a tree of logical tables. The computer identifies one or more aggregated data values for the visual data mark, each of the aggregated data values corresponding to a respective data field in the data model. For each of the aggregated data values, the computer retrieves a respective disaggregated set of data rows from a respective logical table containing the respective data field. The computer displays a summary grid, with a respective tab corresponding to each of the retrieved disaggregated sets of data rows.

20 Claims, 16 Drawing Sheets

Example View Data
Summary
(Desktop Version)
142

Example View Data Full
Data Details
(Desktop Version)
144

Example View Data
Summary
(Web Version)
148

Figure 1F

Example View Data Full
Data Details
(Desktop Version)
150

Example View Data
(Desktop Version)
700

Example View Data Summary (Desktop Version) 702

710
712

View Data: Q1 Pricing Summary Report

Show aliases    Copy    Export All

| Order ID | Customer Name | Product Name | Segment | Order Date | Sales |
|---|---|---|---|---|---|
| CA-2011-03 | Aaron Bergman | Avery 51 | Corporate | 3/07/2016 | $2444 |
| CA-2011-06 | Aaron Bergman | 3-ring staple pack | Consumer | 3/04/2012 | $10 |
| CA-2011-90 | Aaron Bergman | Akro Stacking Bins | Consumer | 4/13/2011 | $820 |
| CA-2013-23 | Aaron Bergman | Avery 51 | Consumer | 6/09/2013 | $2444 |
| CA-2011-28 | Adam Hart | Xerox 1956 | Corporate | 12/14/2011 | $1002 |
| CA-2011-63 | Adam Shillings | Easy Staple Paper | Consumer | 8/26/2012 | $820 |
| CA-2011-60 | Adrian Barton | Acco Hanging Binder | Home Office | 7/31/2014 | $2444 |
| CA-2011-78 | Adrian Barton | Binder Posts | Home Office | 9/18/2014 | $1002 |
| CA-2011-16 | Adrian Barton | Newell 309 | Home Office | 6/23/2011 | $820 |
| CA-2011-75 | Aimee Bixby | LG G3 | Consumer | 1/09/2015 | $2444 |
| CA-2012-34 | Adrian Barton | Xerox 152 | Consumer | 2/15/2016 | $1002 |
| CA-2014-66 | Adrian Barton | Newell 345 | Consumer | 11/19/2017 | $820 |
| CA-2013-87 | Alan Hwang | Belkin 543 | Consumer | 10/29/2016 | $2444 |

Summary  Orders  Customers 704
706
708

Figure 7B

Example View Data
Orders Tab
(Desktop Version)
702

716

View Data: Q1 Pricing Summary Report 1000 rows ☐ Show aliases ☐ Show all fields                    Copy    Export All

| Order ID | Customer Name | Product Name | Segment | Order Date | Sales |
|---|---|---|---|---|---|
| CA-2011-03 | Aaron Bergman | Avery 51 | Corporate | 3/07/2016 | $2444 |
| CA-2011-06 | Aaron Bergman | 3-ring staple pack | Consumer | 3/04/2012 | $10 |
| CA-2011-90 | Aaron Bergman | Akro Stacking Bins | Consumer | 4/13/2011 | $820 |
| CA-2013-23 | Aaron Bergman | Avery 51 | Consumer | 6/09/2013 | $2444 |
| CA-2011-28 | Adam Hart | Xerox 1956 | Corporate | 12/14/2011 | $1002 |
| CA-2011-63 | Adam Shillings | Easy Staple Paper | Consumer | 8/26/2012 | $820 |
| CA-2011-60 | Adrian Barton | Acco Hanging Binder | Home Office | 7/31/2014 | $2444 |
| CA-2011-76 | Adrian Barton | Binder Posts | Home Office | 9/18/2014 | $1002 |
| CA-2011-16 | Adrian Barton | Newell 309 | Home Office | 6/23/2011 | $820 |
| CA-2011-75 | Aimee Bixby | LG G3 | Consumer | 1/09/2015 | $2444 |
| CA-2012-34 | Adrian Barton | Xerox 152 | Consumer | 2/15/2016 | $1002 |
| CA-2014-66 | Adrian Barton | Newell 345 | Consumer | 11/19/2017 | $820 |
| CA-2013-87 | Alan Hwang | Belkin 543 | Consumer | 10/25/2016 | $2444 |

Summary  Orders  Customers

Example
Decomposition of
Aggregate Calculations
804

| Normalized Revenue | Book+ (BetaBookshop2) |

SUM([Actual Revenue]) / AVG([Hrs Writing per Day])

Figure 8B

Example Graphical
User Interface 806

| | |
|---|---|
| ⋮⋮⋮ Columns | |
| ≡ Rows | |

View Data: Sheet 14

95 rows   ☑ Show aliases  ☐ Show all fields                Copy

| Title | Isbn | Actual Revenue |
|---|---|---|
| Post Alley | 989-28-79-52883-6 | 1,427.49 |
| Banana Slug and the Lost Cow | 989-28-3705-775-0 | 714.95 |
| Bystwyth | 989-28-79-74374-1 | 87,542.20 |
| The Triscanipt | 989-28-79-51397-9 | 5,350.71 |
| Adventures of Kaya | 989-28-3705-222-9 | 24,840.88 |
| Banana Slug and the Mossy Rock | 989-28-3705-649-4 | 2,280.28 |
| Cimornul | 989-28-79-56856-6 | Null |
| Concerning Prophecy | 989-28-79-55824-6 | 3,123.65 |
| Whither Thou Goest | 989-28-229-6632-6 | 12,195.25 |
| Don't Check your Ego | 989-28-654-9826-6 | 405.86 |
| Thatchwork Cottage | 989-28-79-05638-4 | 2,631.06 |
| Can I Be Honest? | 989-28-3705-492-6 | 15,671.53 |
| Turn Left Til You Get There | 989-28-79-70597-8 | 1,735.38 |
| Interrobangs for All | 989-28-79-61125-5 | 2,109.25 |
| No More Lightning | 989-28-79-27078-0 | 4,078.30 |
| The Triscanipt | 989-28-79-26824-4 | 13,928.48 |

Summary  Actual Revenue  Author

Example Resolution of
Aggregation of Row-
Level Calculation
810

816

Budget & Spend    Book+ (BetaBookshop2)

[Marketing Spend] - [Promotion Budget]

Example Graphical
User Interface 812

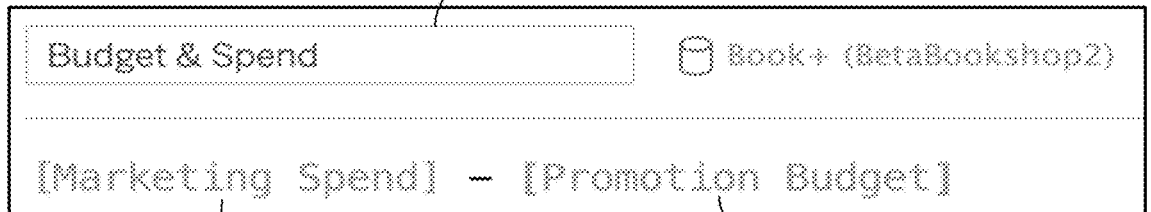

Columns

Rows

Sheet 6

Title
9803 North Millworks Road ▬▬▬▬▬▬▬▬▬▬▬▬ 4,639,982

View Data: Sheet 6

2 rows  ◆  ☑ Show aliases  ☐ Show all fields

| Title | Budget & Spend | Marketing Spend | Promotion Budget |
|---|---|---|---|
| 9803 North Millworks Road | 2,319,991 | 2,320,000 | 9 |
| 9803 North Millworks Road | 2,319,991 | 2,320,000 | 9 |

Summary  Budget_Spend 814        822        824       826

Figure 8E

USING AN OBJECT MODEL TO VIEW DATA ASSOCIATED WITH DATA MARKS IN A DATA VISUALIZATION

RELATED APPLICATIONS

This application claims priority to U.S. Provisional Patent Application No. 62/934,483, filed Nov. 12, 2019, entitled "Using an Object Model to View Data Associated with Data Marks in A Data Visualization," which is incorporated by reference herein in its entirety.

This application is related to U.S. patent application Ser. No. 16/236,611, filed Dec. 30, 2018, entitled "Generating Data Visualizations According to an Object Model of Selected Data Sources," which claims priority to U.S. Provisional Patent Application No. 62/748,968, filed Oct. 22, 2018, entitled "Using an Object Model of Heterogeneous Data to Facilitate Building Data Visualizations," each of which is incorporated by reference herein in its entirety.

This application is related to U.S. patent application Ser. No. 16/236,612, filed Dec. 30, 2018, entitled "Generating Data Visualizations According to an Object Model of Selected Data Sources," which is incorporated by reference herein in its entirety.

This application is related to U.S. patent application Ser. No. 15/911,026, filed Mar. 2, 2018, entitled "Using an Object Model of Heterogeneous Data to Facilitate Building Data Visualizations," which claims priority to U.S. Provisional Patent Application 62/569,976, filed Oct. 9, 2017, "Using an Object Model of Heterogeneous Data to Facilitate Building Data Visualizations," each of which is incorporated by reference herein in its entirety.

This application is also related to U.S. patent application Ser. No. 14/801,750, filed Jul. 16, 2015, entitled "Systems and Methods for using Multiple Aggregation Levels in a Single Data Visualization," and U.S. patent application Ser. No. 15/497,130, filed Apr. 25, 2017, entitled "Blending and Visualizing Data from Multiple Data Sources," which is a continuation of U.S. patent application Ser. No. 14/054,803, filed Oct. 15, 2013, entitled "Blending and Visualizing Data from Multiple Data Sources," now U.S. Pat. No. 9,633,076, which claims priority to U.S. Provisional Patent Application No. 61/714,181, filed Oct. 15, 2012, entitled "Blending and Visualizing Data from Multiple Data Sources," each of which is incorporated by reference herein in its entirety.

This application is also related to U.S. patent application Ser. No. 16/570,969, filed Sep. 13, 2019, entitled "Utilizing Appropriate Measure Aggregation for Generating Data Visualizations of Multi-fact Datasets," which is incorporated by reference herein in its entirety.

TECHNICAL FIELD

The disclosed implementations relate generally to data visualization and more specifically to interactive visual analysis of a data set using an object model of the data set.

BACKGROUND

Data visualization applications enable a user to understand a data set visually, including distribution, trends, outliers, and other factors that are important to making business decisions. Some data elements must be computed based on data from the selected data set. Some data visualization applications use an object model to show relationships between data sets. The data sets that are part of the object model may be stored locally (e.g., on the same device that is displaying the user interface) or may be stored externally (e.g., on a database server or in the cloud). In some instances, each data set corresponds to a database table or a distinct physical file.

When working with a data source in an interactive data visualization application, it is desirable to be able to view data visualizations (e.g., tables, graphs, charts) as well as information related to the visual marks being shown as part of the data visualization. While all of the information, characteristics, and data fields can be found in data source, the raw data may not be accessible directly. In addition, the displayed data marks generally use aggregated data rather than individual rows of data.

SUMMARY

Accordingly, there is a need for interactive data visualization applications (e.g., applications that provide interactive affordances) that allow users to selectively access the additional information from the data visualization. For example, a user may be able to open or view at least a portion of the data fields associated with a visual mark displayed in a data visualization. In this way, users can see the individual rows of data that have been aggregated to form a single data mark.

Generating a data visualization that combines data from multiple tables can be challenging, especially when there are multiple fact tables. In some cases, it can help to construct an object model of the data before generating data visualizations. In some instances, one person is a particular expert on the data, and that person creates the object model. By storing the relationships in an object model, a data visualization application can leverage that information to assist all users who access the data, even if they are not experts.

An object is a collection of named attributes. An object often corresponds to a real-world object, event, or concept, such as a Store. The attributes are descriptions of the object that are conceptually at a 1:1 relationship with the object. Thus, a Store object may have a single [Manager Name] or [Employee Count] associated with it. At a physical level, an object is often stored as a row in a relational table, or as an object in JSON.

A class is a collection of objects that share the same attributes. It must be analytically meaningful to compare objects within a class and to aggregate over them. At a physical level, a class is often stored as a relational table, or as an array of objects in JSON.

An object model is a set of classes and a set of many-to-one relationships between them. Classes that are related by 1-to-1 relationships are conceptually treated as a single class, even if they are meaningfully distinct to a user. In addition, classes that are related by 1-to-1 relationships may be presented as distinct classes in the data visualization user interface. Many-to-many relationships are conceptually split into two many-to-one relationships by adding an associative table capturing the relationship.

Once a class model is constructed, a data visualization application can assist a user in various ways. In some implementations, based on data fields already selected and placed onto shelves in the user interface, the data visualization application can recommend additional fields or limit what actions can be taken to prevent unusable combinations. In some implementations, the data visualization application allows a user considerable freedom in selecting fields, and uses the object model to build one or more data visualizations according to what the user has selected.

In accordance with some implementations, a method facilitates data visualizations. The method is performed at a computer having a display, one or more processors, and memory. The memory stores one or more programs configured for execution by the one or more processors. The computer displays data associated with data marks in a data visualization. The computer generates and displays a data visualization in a data visualization user interface, according to placement of data fields, from a data source, in shelves of the user interface. The data visualization comprises a plurality of visual data marks representing data from the data source. The computer detects a first user input to select a visual data mark. In response to detecting the first user input, the computer obtains a data model encoding the data source as a tree of logical tables. Each logical table has its own physical representation and including a respective one or more logical fields. Each logical field corresponding to either a data field or a calculation that spans one or more logical tables. In some implementations, each edge of the tree connects two logical tables that are related. Each data field is either a measure or a dimension.

The computer then identifies one or more aggregated data values for the visual data mark, each of the aggregated data values corresponding to a respective data field in the data model. For each of the aggregated data values, the computer retrieves a respective disaggregated set of data rows from a respective logical table, in the data model, containing the respective data field (e.g., from the original data source, or from a local cache). The computer then displays a summary grid, with a respective tab corresponding to each of the retrieved disaggregated sets of data rows.

In some implementations, the computer identifies one or more components of the data model corresponding to the visual data mark. The computer generates a query map that maps the one or more components to logical queries. The computer obtains one or more tables by executing logical queries in the query map. The computer generates and displays a data flow diagram corresponding to the visual data mark based on the one or more tables.

In some implementations, the data flow diagram includes a first icon representing the visual data mark, and a second one or more icons representing the one or more tables. In some implementations, the data flow diagram further includes a third one or more icons representing one or more groupings of the one or more tables. In some implementations, the data flow diagram further includes a fourth one or more icons representing one or more operations corresponding to the one or more groupings.

In some implementations, the data flow diagram includes one or more icons that progressively disclose details of the visual data mark in response to detecting one or more user input.

In some implementations, the data flow diagram includes the summary grid.

In accordance with some implementations, a system for facilitating visualization of object models for data sources includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors. The one or more programs include instructions for performing any of the methods described herein.

Thus methods, systems, and graphical user interfaces are provided for interactive visual analysis of a data set.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIG. 1C illustrates an example summary view of aggregated data for the fields shown in the data visualization in FIG. 1B, in accordance with some implementations.

FIG. 1D illustrates an example view of data for selected marks in the data visualization in FIG. 1B, in accordance with some implementations.

FIG. 1F provides a summary view of aggregated data for the fields shown in the data visualization in FIG. 1E, in accordance with some implementations.

FIG. 1G provides a view of disaggregated data for selected marks in the data visualization in FIG. 1E, in accordance with some implementations.

FIG. 7A shows an example graphical user interface that allows a user to view data on a desktop, according to some implementations.

FIG. 7B shows an enlarged view of the summary report shown in FIG. 7A, according to some implementations.

FIG. 7C shows an alternative enlarged view of the summary report shown in FIG. 7A, according to some implementations.

FIG. 8B shows an example for decomposing aggregates into components that correspond to underlying tables, according to some implementations.

FIG. 8C shows an example graphical user interface with a view of data including a tab for a component table after decomposing an aggregate calculation for the example in FIG. 8B, according to some implementations.

FIG. 8D shows an example for resolving aggregation of row-level calculation, according to some implementations.

FIG. 8E shows an example graphical user interface with a view of data including a tab that shows all rows from row-level calculations that are aggregated to the visualization LOD, according to some implementations.

Like reference numerals refer to corresponding parts throughout the drawings.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1A:
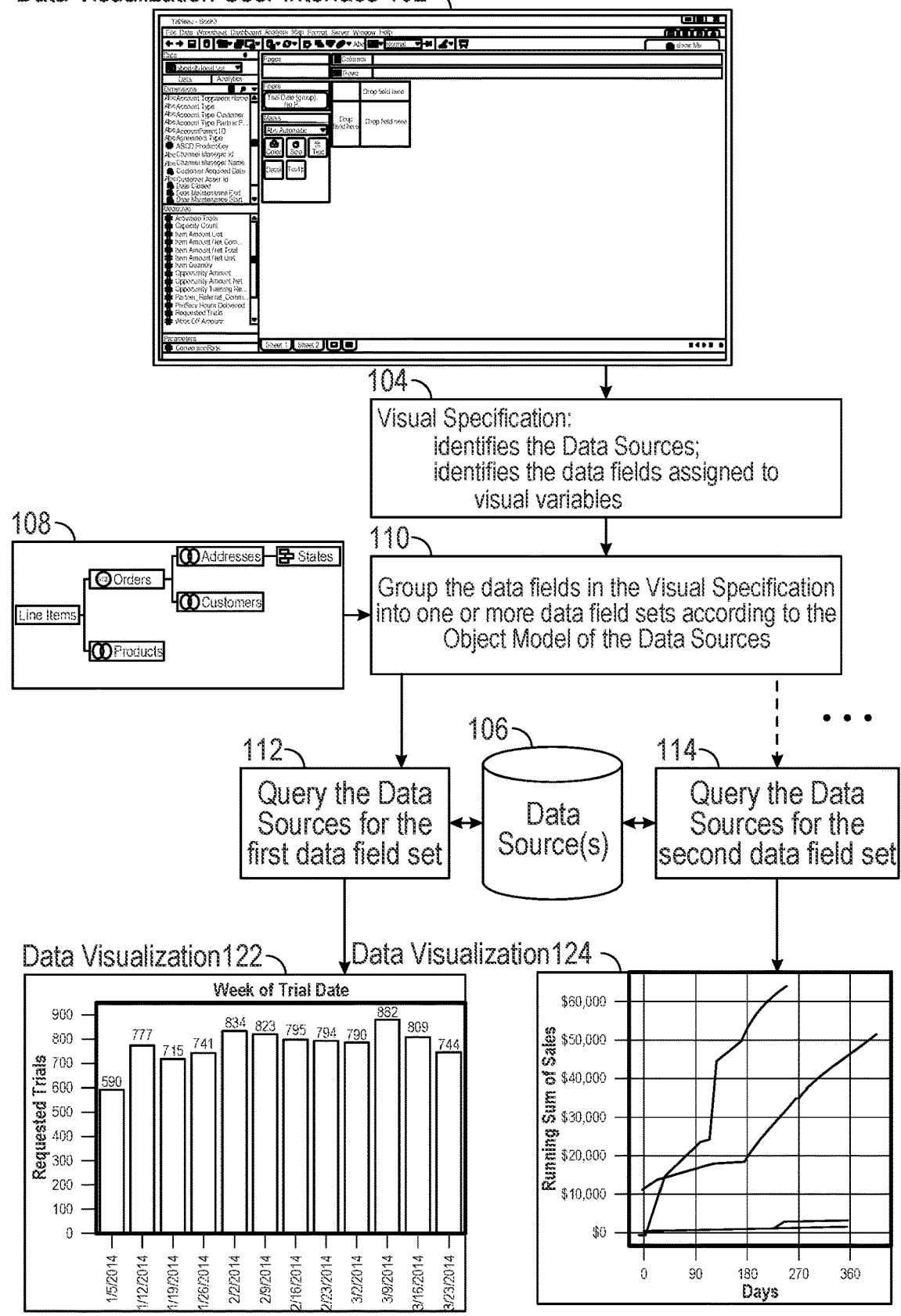
FIG. 1A illustrates conceptually a process of building a data visualization in accordance with some implementations.

Some implementations of an interactive data visualization application use a data visualization user interface 102 to build a visual specification 104, as shown in FIG. 1A. The visual specification identifies one or more data sources 106, which may be stored locally (e.g., on the same device that is displaying the user interface 102) or may be stored externally (e.g., on a database server or in the cloud). The visual specification 104 also includes visual variables. The visual variables specify characteristics of the desired data visualization indirectly according to selected data fields from the data sources 106. In particular, a user assigns zero or more data fields to each of the visual variables, and the values of the data fields determine the data visualization that will be displayed.

In most instances, not all of the visual variables are used. In some instances, some of the visual variables have two or more assigned data fields. In this scenario, the order of the assigned data fields for the visual variable (e.g., the order in which the data fields were assigned to the visual variable by the user) typically affects how the data visualization is generated and displayed.

Some implementations use an object model 108 to build the appropriate data visualizations. In some instances, an object model applies to one data source (e.g., one SQL database or one spreadsheet file), but an object model may encompass two or more data sources. Typically, unrelated data sources have distinct object models. In some instances, the object model closely mimics the data model of the physical data sources (e.g., classes in the object model corresponding to tables in a SQL database). However, in some cases the object model is more normalized (or less normalized) than the physical data sources. An object model groups together attributes (e.g., data fields) that have a one-to-one relationship with each other to form classes, and identifies many-to-one relationships among the classes. In some cases, the many-to-one relationships are illustrated with arrows, with the "many" side of each relationship pointing to the "one" side of the relationship. The object model also identifies each of the data fields (attributes) as either a dimension or a measure. In the following, the letter "D" (or "d") is used to represent a dimension, whereas the latter "M" (or "m") is used to represent a measure. Dimensions are categorical data fields that store discrete values (e.g., data fields with string data types). Measures are typically numeric data fields, which can be aggregated (e.g., but summing or computing an average). When an object model 108 is constructed, it can facilitate building data visualizations based on the data fields a user selects. Because a single object model can be used by an unlimited number of other people, building the object model for a data source is commonly delegated to a person who is a relative expert on the data source, As a user adds data fields to the visual specification (e.g., indirectly by using the graphical user interface to place data fields onto shelves), the data visualization application 222 (or web application 322) groups (110) together the user-selected data fields according to the object model 108. Such groups are called data field sets 294. In many cases, all of the user-selected data fields are in a single data field set 294. In some instances, there are two or more data field sets 294. Each measure m is in exactly one data field set 294, but each dimension d may be in more than one data field set 294.

The data visualization application 222 (or web application 322) queries (112) the data sources 106 for the first data field set 294, and then generates a first data visualization 122 corresponding to the retrieved data. The first data visualization 122 is constructed according to the visual variables 282 in the visual specification 104 that have assigned data fields 284 from the first data field set 294. When there is only one data field set 294, all of the information in the visual specification 104 is used to build the first data visualization 122. When there are two or more data field sets 294, the first data visualization 122 is based on a first visual sub-specification consisting of all information relevant to the first data field set 294. For example, suppose the original visual specification 104 includes a filter that uses a data field f. If the field f is included in the first data field set 294, the filter is part of the first visual sub-specification, and thus used to generate the first data visualization 122.

When there is a second (or subsequent) data field set 294, the data visualization application 222 (or web application 322) queries (114) the data sources 106 for the second (or subsequent) data field set 294, and then generates the second (or subsequent) data visualization 124 corresponding to the retrieved data. This data visualization 124 is constructed according to the visual variables 282 in the visual specification 104 that have assigned data fields 284 from the second (or subsequent) data field set 294.

Figure 1B:
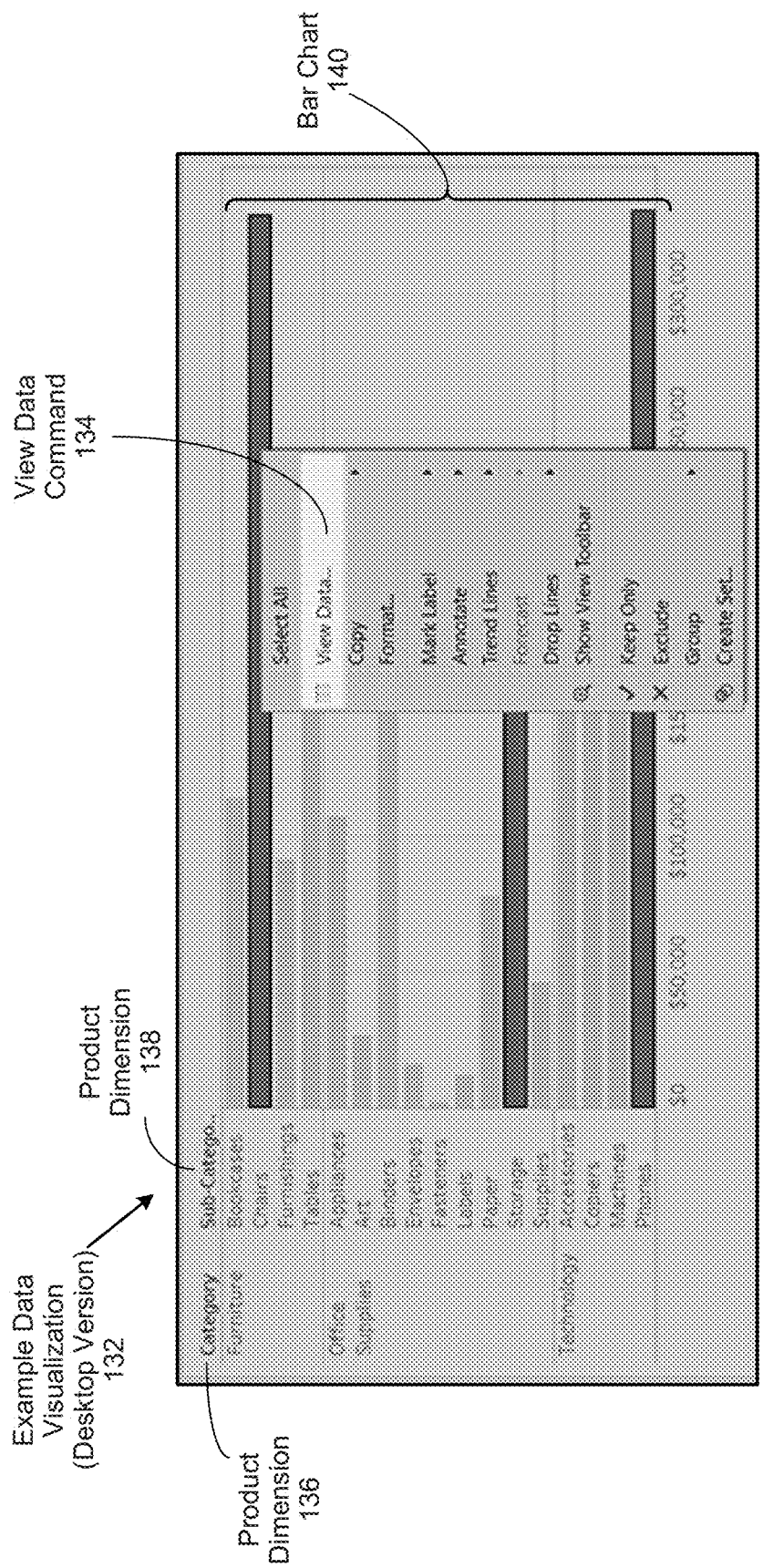
FIG. 1B illustrates an example data visualization, in accordance with some implementations.

FIG. 1B illustrates a desktop version 132 of an example data visualization, in accordance with some implementations. The example shows a view data command 134 that a user can use to display the values for all rows in a data source that underlie a set of marks in the view. The view data command also allows the user to view summary data based on the aggregations in the view. In some implementations, the view data command enables the user to verify the aggregated value associated with a mark, or to isolate and export individual rows associated with data of interest, such as outliers. Some implementations allow a user to view data for a selection of marks, for the fields in a data pane, or when the user is connecting to data. In some implementations, the view data command works in conjunction with relational and multi-dimensional databases. In some implementations, the database is drill-through enabled. Some implementations support viewing multi-dimensional data sources in desktop versions of a data visualization software.

Returning to the example view shown in FIG. 1B, sales for two product dimensions (Category 136 and Sub-Category 138) are displayed as a bar chart 140. Suppose a user wants to view data for the largest marks in each pane. In some implementations (e.g., the desktop version), the user selects the marks, right-clicks (or control-clicks) in the view, and selects 'View Data' on the context menu. Alternatively, a user selects Analysis, then selects the View Data menu item. In some implementations (e.g., online or server versions), the user selects the marks and clicks 'View Data' on the Tooltip menu.

Figures 1C, 1D:
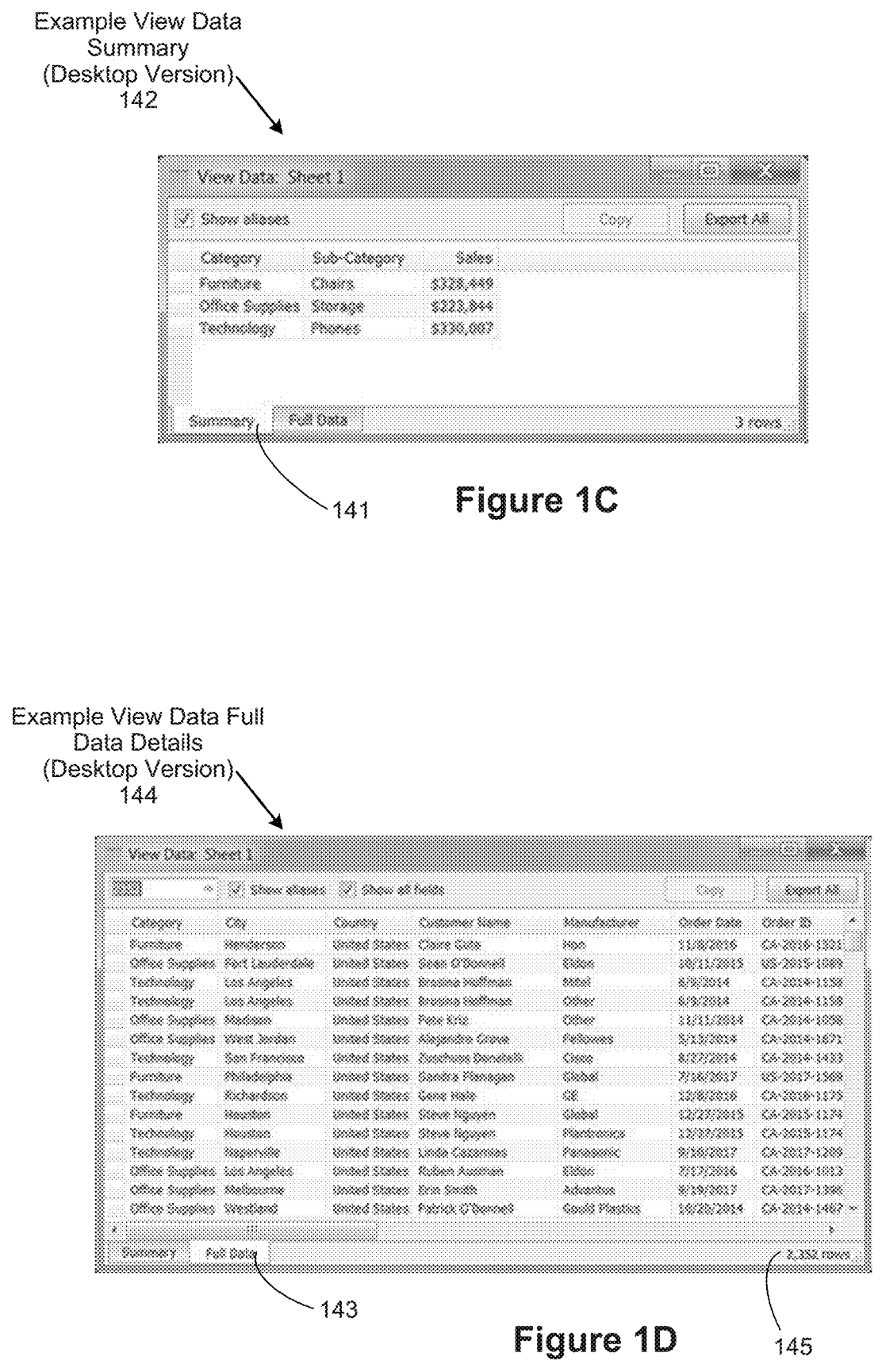

FIG. 1C illustrates an example view 142 of a summary of aggregated data for the fields shown in the data visualization in FIG. 1B, in accordance with some implementations. In the example shown, summarized data is shown in a 'Summary' tab 141. In some implementations, summarized data is provided as a text table of the aggregated data for the fields shown in the view.

FIG. 1D illustrates an example view 144 of data for selected marks in the data visualization in FIG. 1B, in accordance with some implementations. In some implementations, data for the selected marks is displayed in a 'Full Data' tab 143. In some implementations, the lower right of the dialog box shows the number 145 of rows in the underlying data. In some implementations, when using data blending, the Full Data tab shows only the data from the primary data source.

Figure 1E:
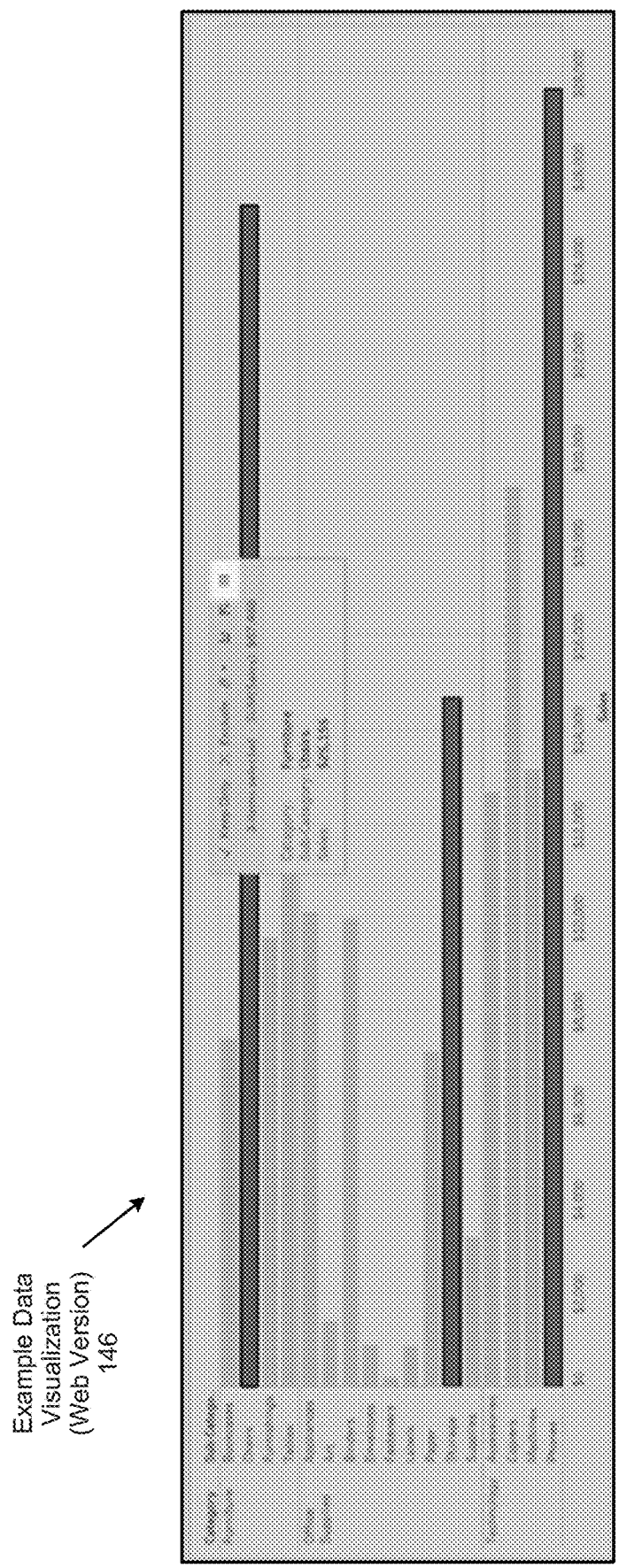
FIG. 1E illustrates an alternative version of the example data visualization in FIG. 1B, in accordance with some implementations.
Figures 1F, 1G:
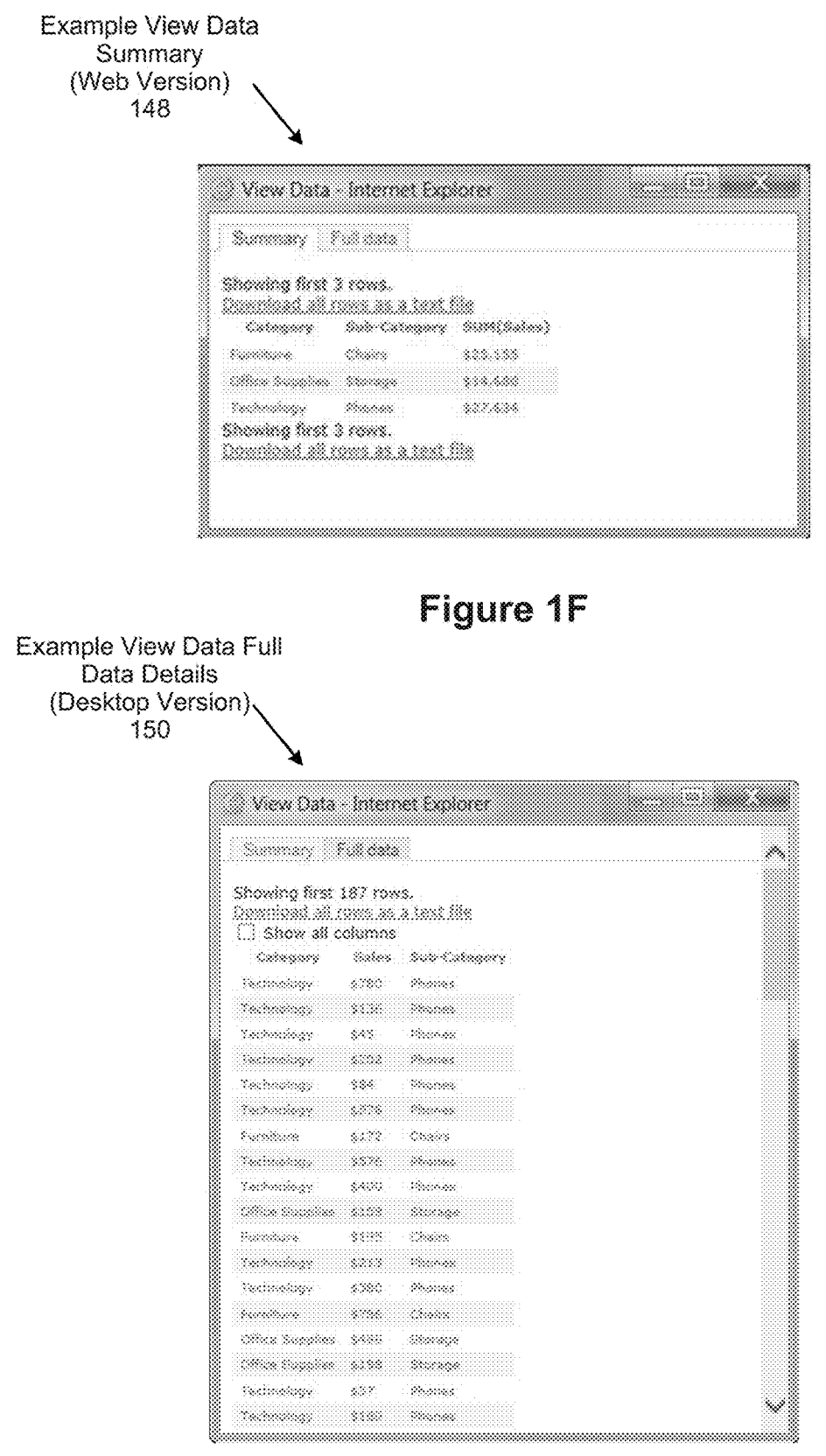

FIG. 1E illustrates a web version 146 of the example data visualization in FIG. 1B, in accordance with some implementations. FIG. 1F illustrates an example view 148 of summary of aggregated data for the fields shown in the data visualization in FIG. 1E, in accordance with some implementations. FIG. 1G illustrates an example view 150 of data for selected marks in the data visualization in FIG. 1E, in accordance with some implementations.

Figure 2:
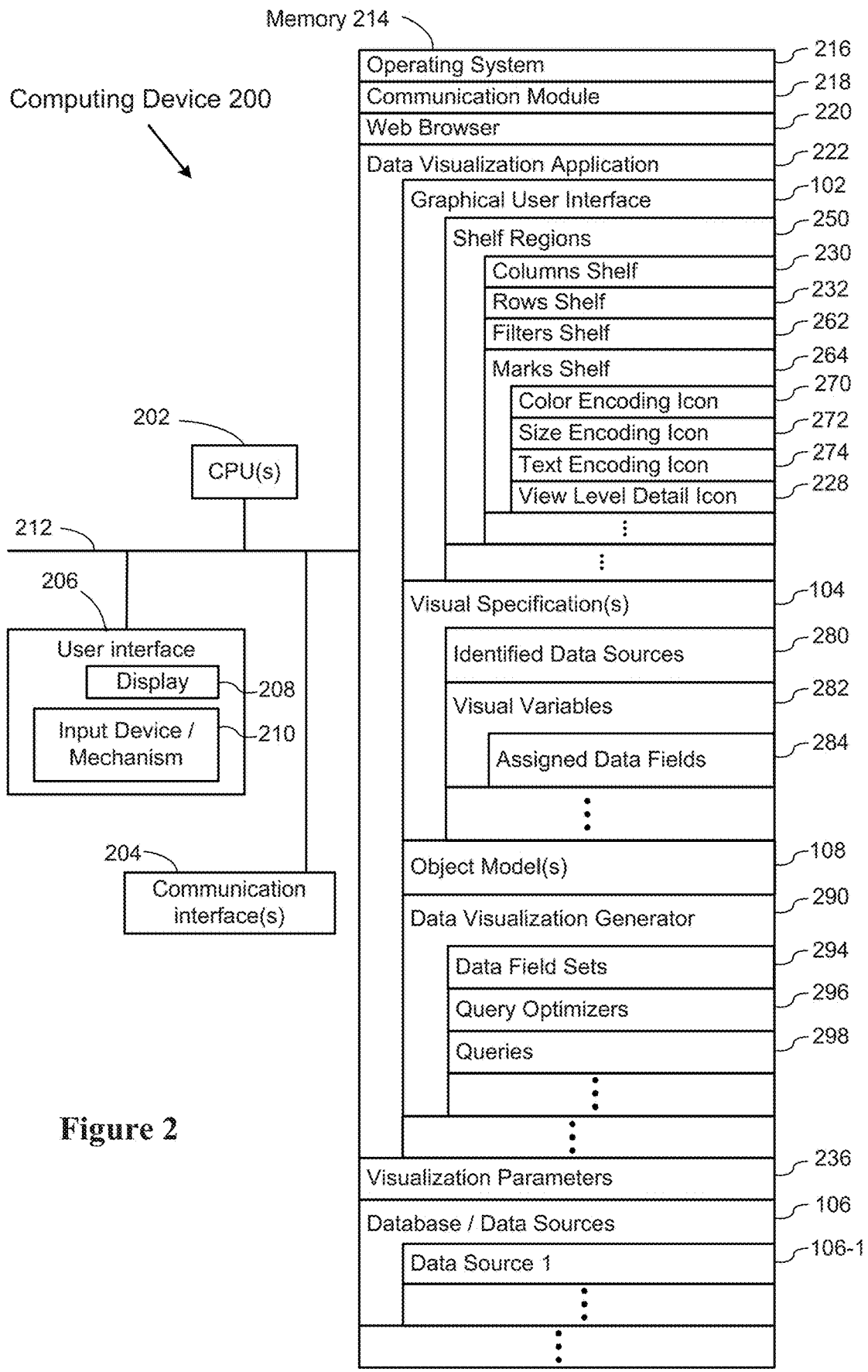
FIG. 2 is a block diagram of a computing device according to some implementations.

FIG. 2 is a block diagram illustrating a computing device 200 that can execute the data visualization application 222 or the data visualization web application 322 to display a data visualization 122. In some implementations, the computing device displays a graphical user interface 102 for the data visualization application 222. Computing devices 200 include desktop computers, laptop computers, tablet computers, and other computing devices with a display and a processor capable of running a data visualization application 222. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard. In some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer-readable storage medium. In some implementations, the memory 214, or the computer-readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 102 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application 322);
- a graphical user interface 102, which enables a user to build a data visualization by specifying elements visually, as illustrated in FIG. 4 below;
- in some implementations, the user interface 102 includes a plurality of shelf regions 250, which are used to specify characteristics of a desired data visualization. In some implementations, the shelf regions 250 include a columns shelf 230 and a rows shelf 232, which are used to specify the arrangement of data in the desired data visualization. In general, fields that are placed on the columns shelf 230 are used to define the columns in the data visualization (e.g., the x-coordinates of visual marks). Similarly, the fields placed on the rows shelf 232 define the rows in the data visualization (e.g., the y-coordinates of the visual marks). In some implementations, the shelf regions 250 include a filters shelf 262, which enables a user to limit the data viewed according to a selected data field (e.g., limit the data to rows for which a certain field has a specific value or has values in a specific range). In some implementations, the shelf regions 250 include a marks shelf 264, which is used to specify various encodings of data marks. In some implementations, the marks shelf 264 includes a color encoding icon 270 (to specify colors of data marks based on a data field), a size encoding icon 272 (to specify the size of data marks based on a data field), a text encoding icon (to specify labels associated with data marks), and a view level detail icon 228 (to specify or modify the level of detail for the data visualization);
- visual specifications 104, which are used to define characteristics of a desired data visualization. In some implementations, a visual specification 104 is built using the user interface 102. A visual specification includes identified data sources 280 (i.e., specifies what the data sources are), which provide enough information to find the data sources 106 (e.g., a data source name or network full path name). A visual specification 104 also includes visual variables 282, and the assigned data fields 284 for each of the visual variables. In some implementations, a visual specification has visual variables corresponding to each of the shelf regions 250. In some implementations, the visual variables include other information as well, such as context information about the computing device 200, user preference information, or other data visualization features that are not implemented as shelf regions (e.g., analytic features);

one or more object models 108, which identify the structure of the data sources 106. In an object model, the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes;

a data visualization generator 290, which generates and displays data visualizations according to visual specifications. Selected data fields are grouped into one or more data field sets 294, as illustrated in FIG. 1A. In accordance with some implementations, the data visualization generator 290 uses an object model 108 to generate queries 298 and/or optimize queries using query optimizers 296. The details of the query generation and optimization techniques are described below in reference to FIGS. 5A-11, according to some implementations;

visualization parameters 236, which contain information used by the data visualization application 222 other than the information provided by the visual specifications 104 and the data sources 106; and zero or more databases or data sources 106 (e.g., a first data source 106-1), which are used by the data visualization application 222. In some implementations, the data sources are stored as spreadsheet files, CSV files, XML, files, flat files, JSON files, tables in a relational database, cloud databases, or statistical databases.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
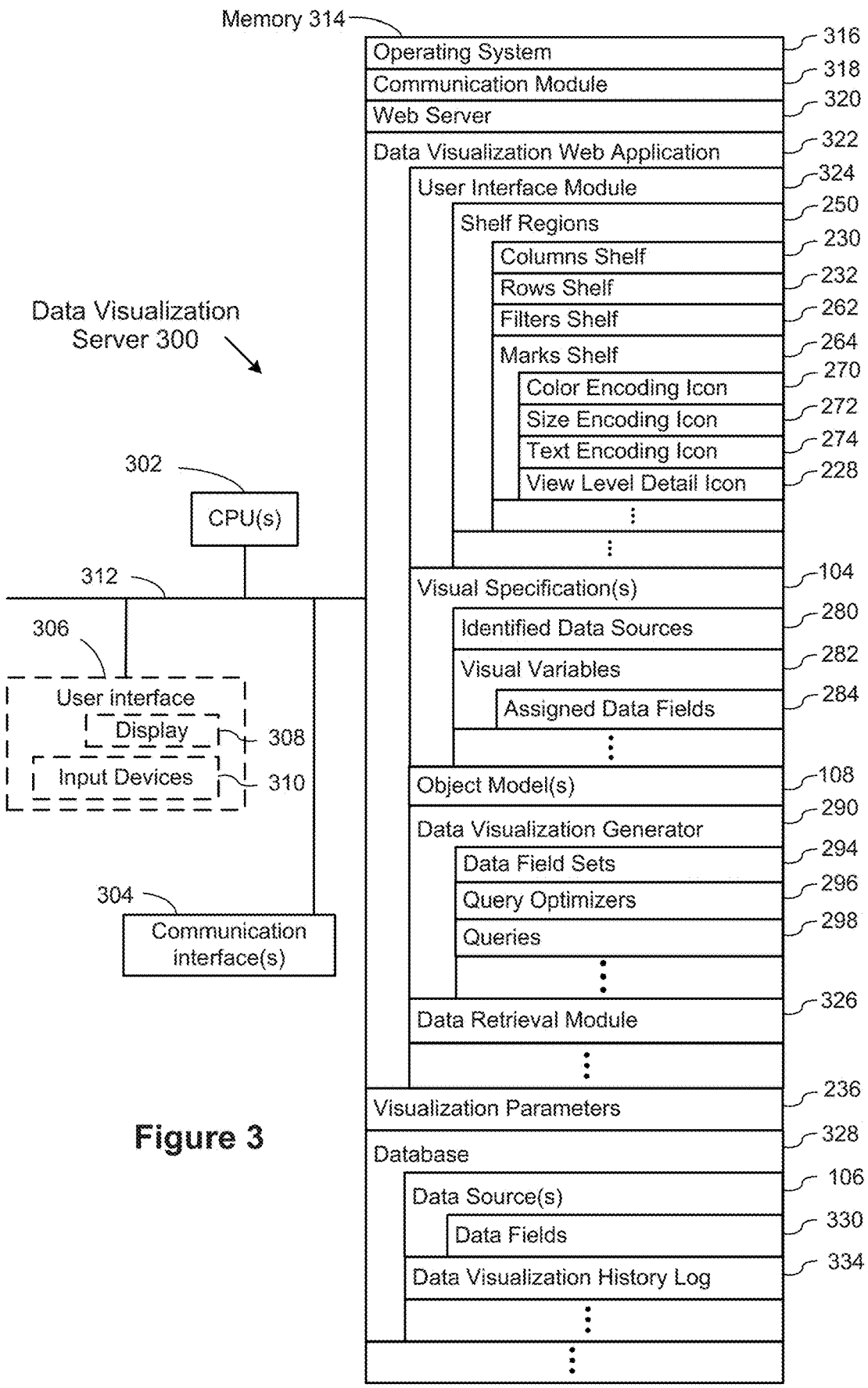
FIG. 3 is a block diagram of a data visualization server according to some implementations.

FIG. 3 is a block diagram of a data visualization server 300 in accordance with some implementations. A data visualization server 300 may host one or more databases 328 or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 314 includes one or more storage devices remotely located from the CPU(s) 302. The memory 314, or alternatively the non-volatile memory devices within the memory 314, comprises a non-transitory computer-readable storage medium.

In some implementations, the memory 314, or the computer-readable storage medium of the memory 314, stores the following programs, modules, and data structures, or a subset thereof:

- an operating system 316, which includes procedures for handling various basic system services and for performing hardware dependent tasks;
- a network communication module 318, which is used for connecting the server 300 to other computers via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- a data visualization web application 322, which may be downloaded and executed by a web browser 220 on a user's computing device 200. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. In some implementations, the user interface module 324 specifies shelf regions 250, as described above for a computing device 200;
- the data visualization web application also stores visual specifications 104 as a user selects characteristics of the desired data visualization. Visual specifications 104, and the data they store, are described above for a computing device 200;
- one or more object models 108, as described above for a computing device 200;
- a data visualization generator 290, which generates and displays data visualizations according to user-selected data sources and data fields, as well as one or more object models that describe the data sources 106. The operation of the data visualization generator is described above with respect to a computing device 200;

in some implementations, the web application 322 includes a data retrieval module 326, which builds and executes queries to retrieve data from one or more data sources 106. The data sources 106 may be stored locally on the server 300 or stored in an external database. In some implementations, data from two or more data sources may be blended. In some implementations, the data retrieval module 326 uses a visual specification 104 to build the queries, as described above for the computing device 200 in FIG. 2;

in some implementations, the memory 314 stores visualization parameters 236, as described above for a computing device 200;

one or more databases 328, which store data used or created by the data visualization web application 322 or data visualization application 222. The databases 328 may store data sources 106, which provide the data used in the generated data visualizations. Each data source 106 includes one or more data fields 330. In some implementations, the database 328 stores user preferences. In some implementations, the database 328 includes a data visualization history log 334. In some implementations, the history log 334 tracks each time the data visualization web application 322 renders a data visualization.

The databases 328 may store data in many different formats, and commonly include many distinct tables, each with a plurality of data fields 330. Some data sources comprise a single table. The data fields 330 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 330 are stored separately from the data source 106. In some implementations, the database 328 stores a set of user preferences for each user. The user preferences may be used when the data visualization web application 322 (or application 222) makes recommendations about how to view a set of data fields 330. In some implementations, the database 328 stores a data visualization history log 334, which stores information about each data visualization generated. In some implementations, the database 328 stores other information, including other information used by the data visualization application 222 or data visualization web application 322. The databases 328 may be separate from the data visualization server 300, or may be included with the data visualization server (or both).

In some implementations, the data visualization history log 334 stores the visual specifications 104 selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, the version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

Example Implementations

In some implementations, the methods described herein may be executed by one or more of: a client computing system (such as a client computing device that can launch a desktop data visualization application or a web browser data visualization application) and a server system that includes one or more computing devices that hosts a data server or computing platform. In some implementations, a first portion of the methods described herein may be implemented in a front-end (e.g., user-facing software) and a second portion (e.g., remaining portions) of the methods may be implemented in a back-end of a computing system.

In some implementations, a data visualization application is configured to display a data visualization (such as a table, chart, or graph that includes visual marks that represent at least a portion of the information in a data source) in a user interface. In response to user interaction (e.g., a user selection or hovering over) with one or more visual marks in the data visualization, the data visualization application may display, in the user interface, additional information in the data source that is related to the visual mark that the user interacted with. For example, in response to a user hovering over a visual mark, the data visualization application may display a diagram or table that includes information from the data source that corresponds to the visual mark.

In some implementations, the data visualization application reverse-engineers an object model query to determine what components of the data source are associated with the visual mark. The data visualization application converts the components of the data source are associated with the visual mark into a JavaScript Object Notation (JSON) structure (e.g., a nested JSON structure) to send to the user interface. In some implementations, the components of the data source are associated with the visual mark are represented in a table in the user interface. The table can be identified by a table ID. A table ID may be anything (such as worksheet data or a key in the data visualization application) that can identify the table. For example, when the table ID includes worksheet data, the table ID is a special table that returns the worksheet data. In another example, the table ID may be a key in a look-up table in the data visualization application that maps to a logical query to run and produce the table. In some implementations, the data visualization application also creates a map from generated table IDs to queries that produced the table.

In some implementations, when the table ID is a key that is a data flow diagram, a value of the key is a dictionary in the format of a "GetDataTableCommand" that obtains the data from the data source for the table.

In some implementations, the table ID is supplied by a back-end of the data visualization application. In some implementations, the table ID includes one or more rows that are displayed in the user interface.

In response to providing the "GetDataTableCommand," the data visualization application returns a "DataSource-DataPresModel" that can be used with existing Data Tab codes to present table data.

In some implementations, the data flow diagram is a JSON dictionary that maps node IDs to their corresponding node structures. In some implementations, the key is a node ID (e.g., a string identifying the node) and a value of the key is a dictionary describing the node. For example, when the key includes summary data, the key refers to a summary data node that is typically shown in a first portion of the data visualization (e.g., a left portion). In another example, when then key includes one or more objects, the key refers to a node containing the object nodes that is typically shown in a second portion of the data visualization (e.g., a right portion).

The following table illustrates examples of nodes and their implications, according to some implementations.

| Key | Required? | Value |
| --- | --- | --- |
| Type | Yes | Node type, a String with one of these values: table, operation, or grouping |
| Inputs | No | List of Node IDs that feed into this Node These generally appear to the RIGHT of the node |
| Title | No | Node title, such as the table name or measure name |
| table-caption | No | String representing the caption to show above the table if this node is clicked |
| table-id | No | String to pass to GetDataTableCommand to get the table data |
| highlighted-columns | No | FUTURE: These columns should be highlighted in the data table |
| icon-url | No | String representing the URL of an icon resource to display |
| icon-width | If icon-url is provided | Width of the icon (so you don't have to wait for the icon to load before performing layout) |
| icon-height | If icon-url is provided | Height of the icon (so you don't have to wait for the icon to load before performing layout) |

In some implementations, in addition to all the properties that a node has, a table node also includes a key that is a table-type key. The table-type key has a value that is a string that represents the type of table. The following table provides examples of strings and their underline color, according to some implementations.

| Key | Value | |
| --- | --- | --- |
| | String | Underline color |
| table-type | String representing the type of table | |
| | viz | #896299 |
| | Dimension | #499662 |
| | Measure | #00bl80 |
| | Object | #b24949 |

Figure 4A:
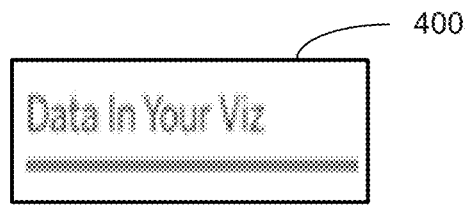
FIG. 4A provides an example visual representation of a table node corresponding to data in a visualization, according to some implementations.

FIG. 4A illustrates an example visual representation (e.g., an icon) of a table node corresponding to data in the visualization, according to some implementations.

In some implementations, a node may be an operation node.

Figure 4B:
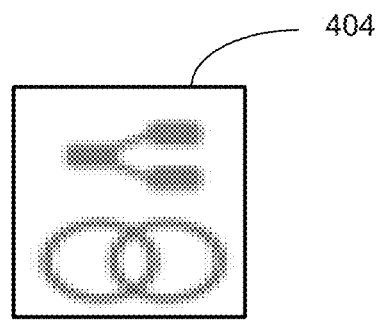
FIG. 4B provides an example visual representation (e.g., an icon) of an operation node, according to some implementations.

FIG. 4B illustrates an example visual representation (e.g., an icon) of an operation node, according to some implementations.

Figure 4C:
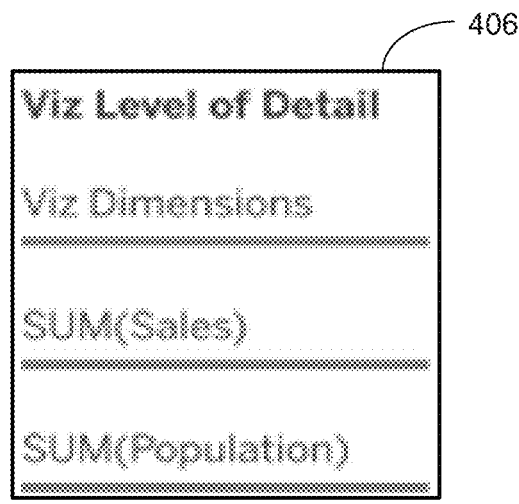
FIG. 4C provides example visual representations of visualization level of detail, according to some implementations.

In some implementations, a grouping node may group several nodes together. A grouping node has all the properties of a node, plus a key that is a child-node. In such cases, the key has a value that is a list of node IDs for nodes to show inside the grouping node. FIG. 4C illustrates example visual representations of visualization level of detail, according to some implementations.

Data Flow Diagram Examples

Various examples are provided to help illustrate the relationship between JSON (as described above) produced by the backend, and the data flow diagram (e.g., diagrams that appear in a View Data dialog), according to some implementations.

Figure 5A:
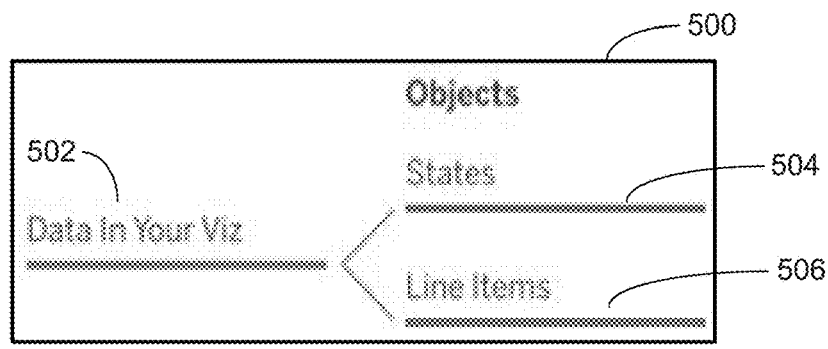
FIG. 5A provides an example data flow diagram that contains nodes for producing a data mark, according to some implementations.

FIG. 5A illustrates an example data flow diagram 500 that contains only the required nodes for producing a data mark, according to some implementations. In some implementations, the nodes shown may not correspond to a valid or complete query. As shown, the diagram shows relationship between data in a visualization 502 and one or more objects (e.g., the objects States 504 and Line Items 506). Some implementations use a JSON object shown below:

```
{
"data-flow-diagram": {
    "summary-data": {
        "type": "table",
        "title": "Data In Your Viz",
        "table-caption": "This data appears in your viz",
        "table-id": "worksheet-data",
        "table-type": "viz",
        "inputs": ["object:States", "object:Line Items"]
    },
    "objects": {
        "type": "grouping",
        "title": "Viz Level of Detail",
        "child-nodes": ["object:States", "object:Line Items"]
    },
    "object:States": {
        "type": "table",
        "title": "States",
        "table-caption": "Your selected marks were computed using these rows from States.",
        "table-id": "wefh e8ofhalw guirh ehlrhuihrueih uilhgurhuiaerihgaerliu hligrui auil uli ui",
        "table-type": "object"
```

```
        },
        "object:Line Items": {
          "type": "table",
          "title": "Line Items",
          "table-caption": "Your selected marks were com-
             puted using these rows from Line Items.",
          "table-id":      "zxcv,mnxczvasdkfu09wa8eufoielhoa
             deeahf uiwehflhuehguilg h dg huhguriaglhgh"
          "table-type": "object"
        }
      }
    }
  }
```

Figure 5B:
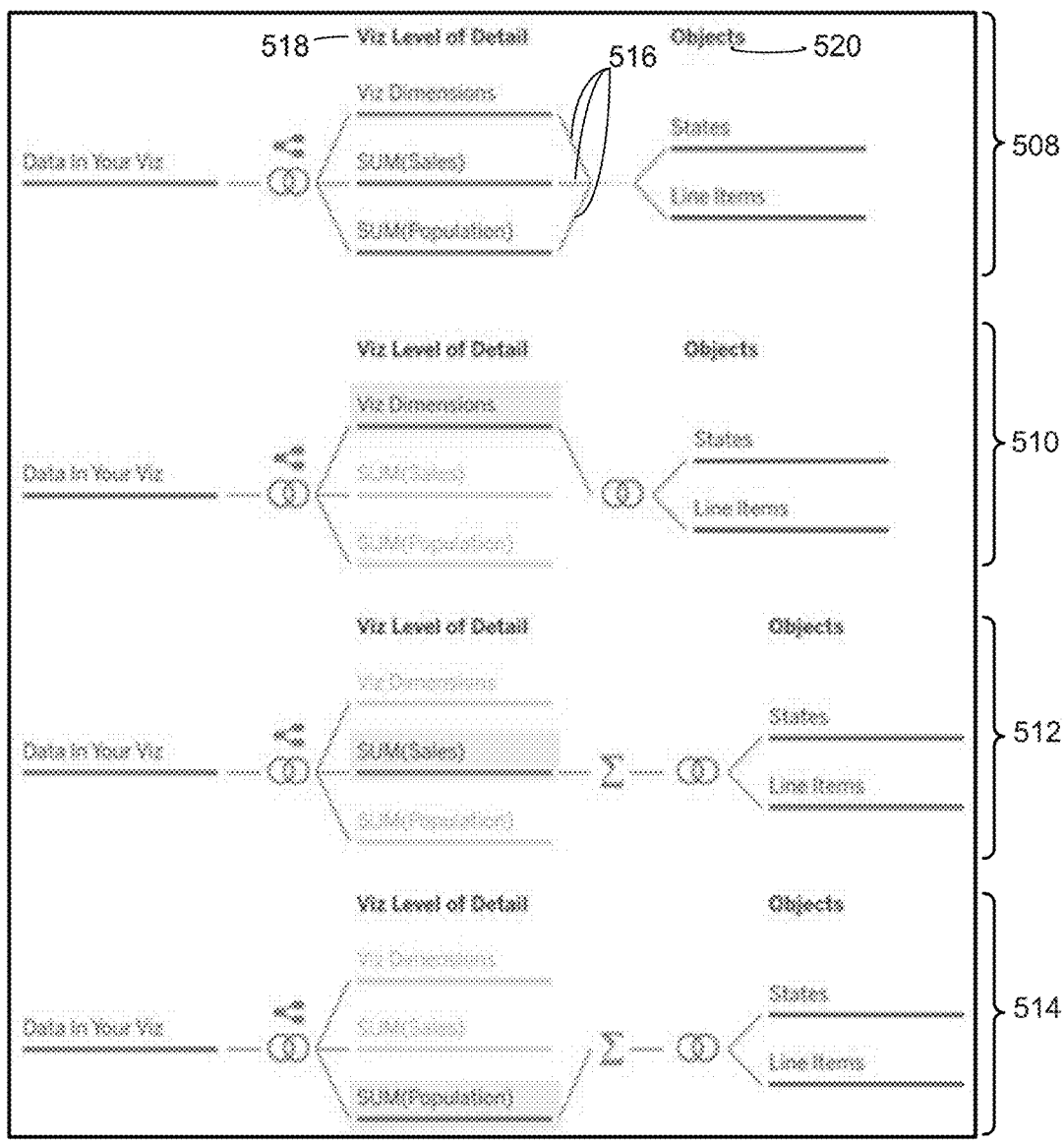
FIG. 5B shows example data flow diagrams, according to some implementations.

In some implementations, when a dialogue (e.g., a View Data dialogue box) first appears, a data flow diagram is shown. The data flow diagram includes additional objects compared to the diagram shown in FIG. 5A, according to some implementations. FIG. 5B illustrates various examples of data flow diagrams (e.g., the diagrams 508, 510, 512, and 514), in accordance with some implementations. In some implementations, the data flow diagram includes one or more connections 516 between a visualization (viz) level of detail 518 and objects 520. In some implementations, the connection is illustrated by a dotted line to indicate that each table on the left is not necessarily connected to each table on the right. In some implementations, the connections only appear when one of the visualization level of detail tables is selected by a user.

Some implementations use a Scalable Vector Graphics (SVG) or a similar Extensible Markup Language (XML)-based vector image format for two-dimensional graphics with support for interactivity and animation, to generate visual representations of data flow diagrams. An example SVG used to generate the data flow diagrams shown in FIG. 5A or 5B is shown below for illustration:

```
<?xml version="1.0" encoding="UTF-8"?>
<svg xmlns="http://www.w3.org/2000/svg" width="530"
height="160" version="1.1" viewBox="0 0 530 160">
  <g transform="translate(0 -962.52)">
    <text x="211.87341" y="1057.7158" fill="#333333" font-
family="sans-serif" font-size="12.173px" letter-spacing="0px"
stroke-width=".91296" word-spacing="0px" style="line-
height:1.25" xml:space="preserve"><tspan x="211.87341"
y="1057.7158" fill="#333333" font-family="'Benton Sans' " font-
size="12px" stroke-width=". 91296">SUM (Sales )</tspan></text>
    <path d="m212 1066h119" fill="none" stroke="#00b180"
stroke-width="3" />
    <text x="211.87341" y="1097.7158" fill="#333333" font-
family="sans-serif" font-size="12.173px" letter-spacing="0px"
stroke-width=".91296" word-spacing="0px" style="line-
height:1.25" xml:space="preserve"><tspan x="211.87341"
y="1097.7158" fill="#333333" font-family=" 'Benton Sans' " font-
size="12px" stroke-
width=". 91296">SUM (Population)</tspan></text>
    <path d="m212 1106h119" fill="none" stroke="#00b180"
stroke-width="3" />
    <text x="211.87341" y="1017.7158" fill="#333333" font-
family="sans-serif" font-size="12.173px" letter-spacing="0px"
stroke-width=".91296" word-spacing="0px" style="line-
height:1.25" xml: space="preserve"><tspan x="211.87341"
y="1017.7158" fill="#333333" font-family=" 'Benton Sans' " font-
size="12px" stroke-width=".91296">Viz Dimensions</tspan></text>
    <path d="m212 1026h119" fill="none" stroke="#4996b2"
stroke-width="3" />
    <text x="7.8734131" y="1057.7158" fill="#333333" font-
family="sans-serif" font-size="12.173px" letter-spacing="0px"
stroke-width=".91296" word-spacing="0px" style="line-
height:1.25" xml: space="preserve"><tspan x="7.8734131"
y="1057.7158" fill="#333333" font-family=" 'Benton Sans' " font-
size="12px" stroke-width=".91296">Data In Your
Viz</tspan></text>
    <path d="m8 1066h119" fill="none" stroke="#896299"
```

-continued

```
stroke-width="3" />
    <text x="211.87341" y="985.71582" fill="#333333" font-
family="sans-serif" font-size="12.173px" letter-spacing="0px"
stroke-width=".91296" word-spacing="0px" style="line-
height:1.25" xml:space="preserve"><tspan x="211.87341"
y="985.71582" fill="#333333" font-family=" 'Benton Sans' " font-
size="12px" font-weight="bold" stroke-width=".91296">Viz Level
of Detail</tspan></text>
    "<g fill="none" stroke="#666">
      <circle cx="165.63" cy="1064.9" r="7.3913" stroke-
width="1.4783" />
      <circle cx="174.87" cy="1064.9" r="7.3913" stroke-
width="1.4783" />
      <g stroke-width="1px">
        <path d="m207.25 1025.5-20.25 40.625" />
        <path d="m187 1065.5 20.25 40" />
        <path d="m187 1066 20.25-1e-4" />
        <path d="m133 1066 20.25-1e-4" />
      </g>
    </g>
    <text x="403.87341" y="985.71582" fill="#333333" font-
family="sans-serif" font-size="12.173px" letter-spacing="0px"
stroke-width=".91296" word-spacing="0px" style="line-
height:1.25" xml:space="preserve"><tspan x="403.87341"
y="985.71582" fill="#333333" font-family=" 'Benton Sans' " font-
size="12px" font-weight="bold" stroke-
width=" .91296">Objects</tspan></text>
    <text x="403.87341" y="1037.7158" fill="#333333" font-
family="sans-serif" font-size="12.173px" letter-spacing="0px"
stroke-width=".91296" word-spacing="0px" style="line-
height:1.25" xml:space="preserve"><tspan x="403.87341"
y="1037.7158" fill="#333333" font-family=" 'Benton Sans' " font-
size="12px" stroke-width=".91296">States</tspan></text>
    <path d="m404 1046h119" fill="none" stroke="#b24949"
stroke-width="3" />
    <text x="403.87341" y="1077.7158" fill="#333333" font-
family="sans-serif" font-size="12.173px" letter-spacing="0px"
stroke-width=".91296" word-spacing="0px" style="line-
height:1.25" xml:space="preserve"><tspan x="403.87341"
y="1077.7158" fill="#333333" font-family=" 'Benton Sans' " font-
size="12px" stroke-width=".91296">Line Items</tspan></text>
    <path d="m404 1086h119" fill="none" stroke="#b24949"
stroke-width="3" />
    <g transform="translate(-111 330)">
      <rect x="271.88" y="712.1" width="7.4092"
height="4.6874" rx="1.3609" ry="1.3609" fill="#747474" />
      <path d="m278.2 713.03 6.1017-3.1598" fill="none"
stroke="#747474" stroke-width="1.3075" />
      <rect x="283.21" y="707.74" width="7.4092"
height="4.6874" rx="1.3609" ry="1.3609" fill="#747474" />
      <rect x="283.21" y="716.46" width="7.4092"
height="4.6874" rx="1.3609" ry="1.3609" fill="#747474" />
      <path d="m284.3 719.13-6.1017-3.1598" fill="none"
stroke="#747474" stroke-width="1.3075" />
    </g>
    <g fill="none" stroke="#666">
      <path d="m335 1025.5 20.073 40.354" stroke-width="1px" />
      <path d="m355.25 1065.5-20.25 40" stroke-width="1px" />
      <path d="m376.5 1066-19-1e-4" stroke-dasharray="1, 3" />
      <g stroke-width="1px">
        <path d="m401.25 1045.9-20.073 19.978" />
        <path d="m381 1065.5 20.25 20.75" />
        <path d="m354.5 1066-19.5-1e-4" />
      </g>
    </g>
  </g>
</svg>
```

Some implementations use a JSON object for describing the data flow diagrams shown in FIG. 5B. An example JSON object is shown below:

```
{
  "data-flow-diagram": {
    "summary-data": {
      "type": "table",
      "title": "Data In Your Viz",
```

-continued

```
        "table-caption": "This data appears in your viz",
        "table-id": "worksheet-data"
        "table-type": "viz",
        "inputs": ["object-model-join"]
    },
    "object-model-join": {
        "type": "operation",
        "title": "Object Model Join",
        "inputs": ["viz-dimensions", "sum-sales", "sum-population" ],
        "icon-url": "/path/to/object-model-join.png"
        "icon-width": 26,
        "icon-height": 36
    },
    "viz-level-of-detail": {
        "type": "grouping",
        "title": "Viz Level of Detail",
        "child-nodes": ["viz-dimensions", "sum-sales", "sum-population" ]
    },
    "viz-dimensions": {
        "type": "table",
        "title": "Viz Dimensions",
        "table-caption": "This table contains only the dimensions in your viz",
        "table-id": "sdfkljhsdfkjihsadfkjihsadfkjihdfkjhfkjsdfhsdkhfksjidhfkjsdhfkl shfkjsadkfhkahfkdsf",
        "table-type": "dimension",
        "inputs": ["viz-dimensions-j oin"]
    },
    "viz:SUM(Sales)": {
        "type": "table",
        "title": "SUM(Sales)",
        "table-caption": "This table was computed for the SUM(Sales) measure",
        "table-id": "sdfkljhsdfkjihsadfkjihsadfkjlhdfkjhfkjsdfhsdkhfksjidhfkjsdhfkl shfkjsadkfhkahfkdsf" ,
        "table-type": "measure",
        "inputs": ["SUM(Sales)-aggregation"]
    },
    "viz:SUM(Population)" : {
        "type": "table",
        "title": "SUM(Population)" ,
        "table-caption": "This table was computed for the SUM(Population) measure",
        "table-id": "sdfkljhsdfkjihsadfkjihsadfkjlhdfkjhfkjsdfhsdkhfksjidhfkjsdhfkl shfkjsadkfhkahfkdsf" ,
        "table-type": "measure",
        "inputs": ["SUM(Population)-aggregation"]
    },
    "viz-dimensions-join" : {
        "type": "operation",
        "title": "Viz Dimensions Object Model Join",
        "inputs": ["object:States" , "object:Line Items"],
        "icon-url": "/path/to/object-model-join.png"
        "icon-width": 26,
        "icon-height": 36
    },
    "SUM(Sales)-aggregation": {
        "type": "operation",
        "title": "SUM(Sales) Object Model Join",
        "inputs": ["SUM(Sales)-join"],
        "table-caption": "SUM(Sales) is computed by aggregating at the State level of detail.",
        "table-id": "sdfkljhsdfkjlhsadfkjihsadfkjihdfkjhfkjsdfhsdkhfksjidhfkjsdhfkl shfkjsadkfhkahfkdsf",
        "icon-url": "/path/to/object-model-join.png"
        "icon-width": 26,
        "icon-height": 36
    },
    "SUM(Sales)-join": {
        "type": "operation",
        "title": "SUM(Sales) Object Model Join",
        "inputs": ["object:States", "object:Line Items"],
        "table-caption": "SUM(Sales) is computed by joining the States and Line Items objects.",
        "table-id": "sdfkljhsdfkjihsadfkjihsadfkjilhdfkjhfkjsdfhsdkhfksjidhfkjsdhfkl shfkjsadkfhkahfkdsf",
        "icon-url": "/path/to/object-model-join.png"
        "icon-width": 26,
        "icon-height": 36
    },
    "SUM(Population)-aggregation": {
        "type": "operation",
        "title": "SUM(Population) Object Model Join",
        "inputs": ["SUM(Population)-join"] ,
        "table-caption": "SUM(Population) is computed by aggregating at the State level of detail.",
        "table-id": "sdfkljhsdfkjihsadfkjihsadfkjilhdfkjhfkjsdfhsdkhfksjidhfkjsdhfkl shfkjsadkfhkahfkdsf",
        "icon-url": "/path/to/object-model-join.png"
        "icon-width": 26,
        "icon-height": 36
    },
    "SUM(Population)-join" : {
        "type": "operation",
        "title": "SUM(Population) Object Model Join",
        "inputs": ["object:States", "object:Line Items"],
        "table-caption": "SUM(Population) is computed by joining the States and Line Items objects.",
        "table-id": "sdfkljhsdfkjihsadfkjihsadfkjilhdfkjhfkjsdfhsdkhfksjidhfkjsdhfkl shfkjsadkfhkahfkdsf" ,
        "icon-url": "/path/to/object-model-join.png"
        "icon-width": 26,
        "icon-height": 36
    },
    "objects": {
        "type": "grouping",
        "title": "Viz Level of Detail",
        "child-nodes": ["object:States", "object:Line Items"]
    },
    "object:States": {
        "type": "table",
        "title": "States",
        "table-caption": "Your selected marks were computed using these rows from States.",
        "table-id": "wefh e8ofhalw guirh ehlrhuihrueih uilhgurhuiaerihgaerliu hligrui auil uli ui"
        "table-type": "object"
    },
    "object:Line Items": {
        "type": "table",
        "title": "Line Items",
        "table-caption": "Your selected marks were computed using these rows from Line Items.",
        "table-id": "zxcv,mnxczvasdkfu09wa8eufoielhoa deeahf uiwehfihuehguilg h dg huhguriaglhgh"
        "table-type": "object"
    }
  }
}
```

In this way, some implementations provide progressive disclosure of data used to produce visual marks in a data visualization. Some implementations allow a user to select a mark (or a group of marks) in a visualization and show data that produced the mark (or the group of marks). Some implementations provide data visualization ability to select, expand or contract features or components, thereby providing progressive disclosure. Some implementations allow the user to peel objects, for progressive disclosure of details. Some implementations allow a user to explore data by drilling into components of a data visualization.

Some implementations provide an explain the mark feature that helps explain to a user the source and/or formula (or functions) that resulted in the mark (or group of marks). For example, some implementations provide top reasons (e.g., 5 reasons) for the marks. Some implementations show rows of data that contributed to the mark. Some implementations use a preset scoring algorithm to rank rows of data. Some implementations allow users to pick or select a scoring algorithm or a set of algorithms to apply. In this way, some implementations show a roadmap from data marks to contributing data.

Some implementations provide a view data dialog box to view data corresponding to a mark (or a set of visual marks). Some implementations provide summary data corresponding to visual marks. Some implementations provide data values for the marks, and when a user selects the marks, further show contributions to the marks, progressively disclosing details in response to user selection. In some implementations, when each measure is aggregated at different level, a different tab is shown for each measure. In some implementations, different visualization levels are shown. In some implementations, the user is allowed to switch between different levels and the display toggles or switches accordingly. Some implementations allow users to progressively drill data details. For example, a user can determine which lender charged more, then follow that with determining which lender charged more than other lenders.

Some implementations allow users to access visualization-level and row-level text data in a tabular format. Some implementations support multiple underlying tables. Some implementations show a summary tab and/or multiple tabs, one tab for each underlying table used for a visualization. In some implementations, an object model-aware data visualization uses more than one underlying table, and the tables are kept separate as "objects" and/or are logically joined on a query.

Some implementations enable a user to understand the data aggregated at the visualization level-of-detail. Some implementations show rows used from each table for the visualization. Some implementations allow users to export summary and row-level data (e.g., as a CSV file) used in the data visualization. Some implementations one or more options to export data from a summary tab and/or one or more table tabs.

Some implementations allow users to persist customizations of their views, and/or search, show/hide, arrange, and sort columns for each table. Some implementations allow users to step through a query graph to see how data is aggregated. Some implementations allow users to view data by object. Some implementations allow users to view data by visualization or data marks; only the rows used per table are shown. Some implementations allow the users to adjust number of rows for all tables. Some implementations allow users to use a screen reader with keyboard navigation for summary and/or tab for each table. Some implementations allow users to export and/or copy from each tab. Some implementations allow users to search for column(s) within each table. Some implementations allow users to arrange columns of view data and/or persist the arrangement. Some implementations allow users to show and/or hide columns in epr table view data tab. Some implementations allow users to sort view data by column and it is persisted. In some implementations, when a user exports data, view data shows same columns as when the data is arranged and sorted in view.

Figure 6:
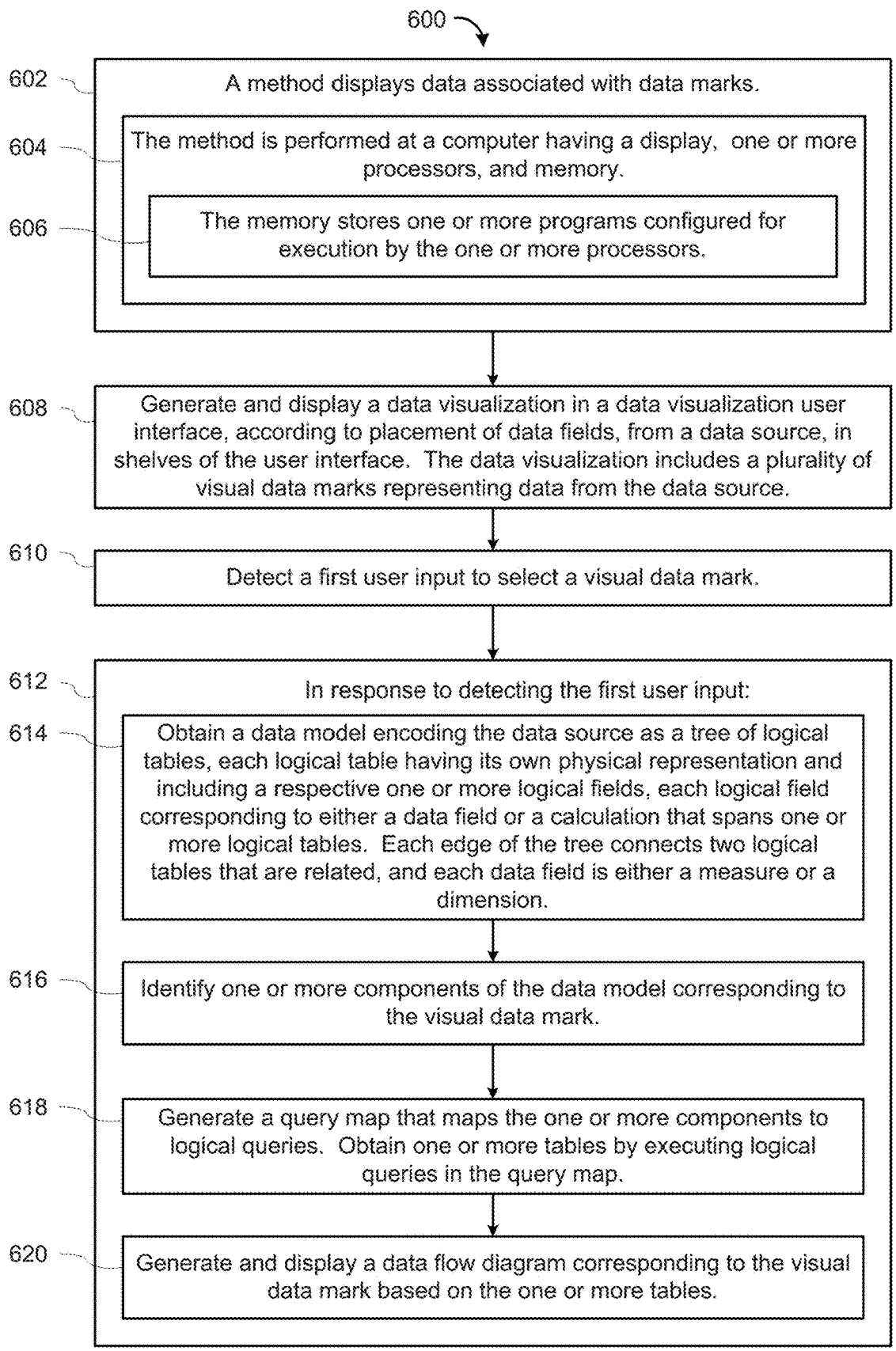
FIG. 6 provides a flowchart of a method for displaying data associated with data marks in a data visualization, in accordance with some implementations.

FIG. 6 provides a flowchart of a method 600 for displaying (602) data associated with data marks in a data visualization according to the techniques described above, in accordance with some implementations. The method 600 is performed (604) at a computing device 200 having one or more processors and memory. The memory stores (606) one or more programs configured for execution by the one or more processors. The computer generates and displays (608) a data visualization in a data visualization user interface, according to placement of data fields, from a data source, in shelves of the user interface. The data visualization comprises a plurality of visual data marks representing data from the data source. The computer detects (610) a first user input to select a visual data mark. In response to detecting the first user input, the computer obtains (614) a data model encoding the data source as a tree of logical tables. Each logical table has its own physical representation and including a respective one or more logical fields. Each logical field corresponding to either a data field or a calculation that spans one or more logical tables. Each edge of the tree connects two logical tables that are related. Each data field is either a measure or a dimension. The computer identifies (616) one or more components of the data model corresponding to the visual data mark. The computer generates (618) a query map that maps the one or more components to logical queries, and obtains one or more tables by executing logical queries in the query map. The computer generates and displays (620) a data flow diagram corresponding to the visual data mark based on the one or more tables.

In some implementations, the data flow diagram includes a first icon representing the visual data mark, and a second one or more icons representing the one or more tables. In some implementations, the data flow diagram further includes a third one or more icons representing one or more groupings of the one or more tables. In some implementations, the data flow diagram further includes a fourth one or more icons representing one or more operations corresponding to the one or more groupings.

In some implementations, the data flow diagram includes one or more icons that progressively disclose details of the visual data mark in response to detecting one or more user input.

In some implementations, the data flow diagram includes visualization of one or more rows of the one or more tables that contribute to the visual data mark.

Figure 7A:
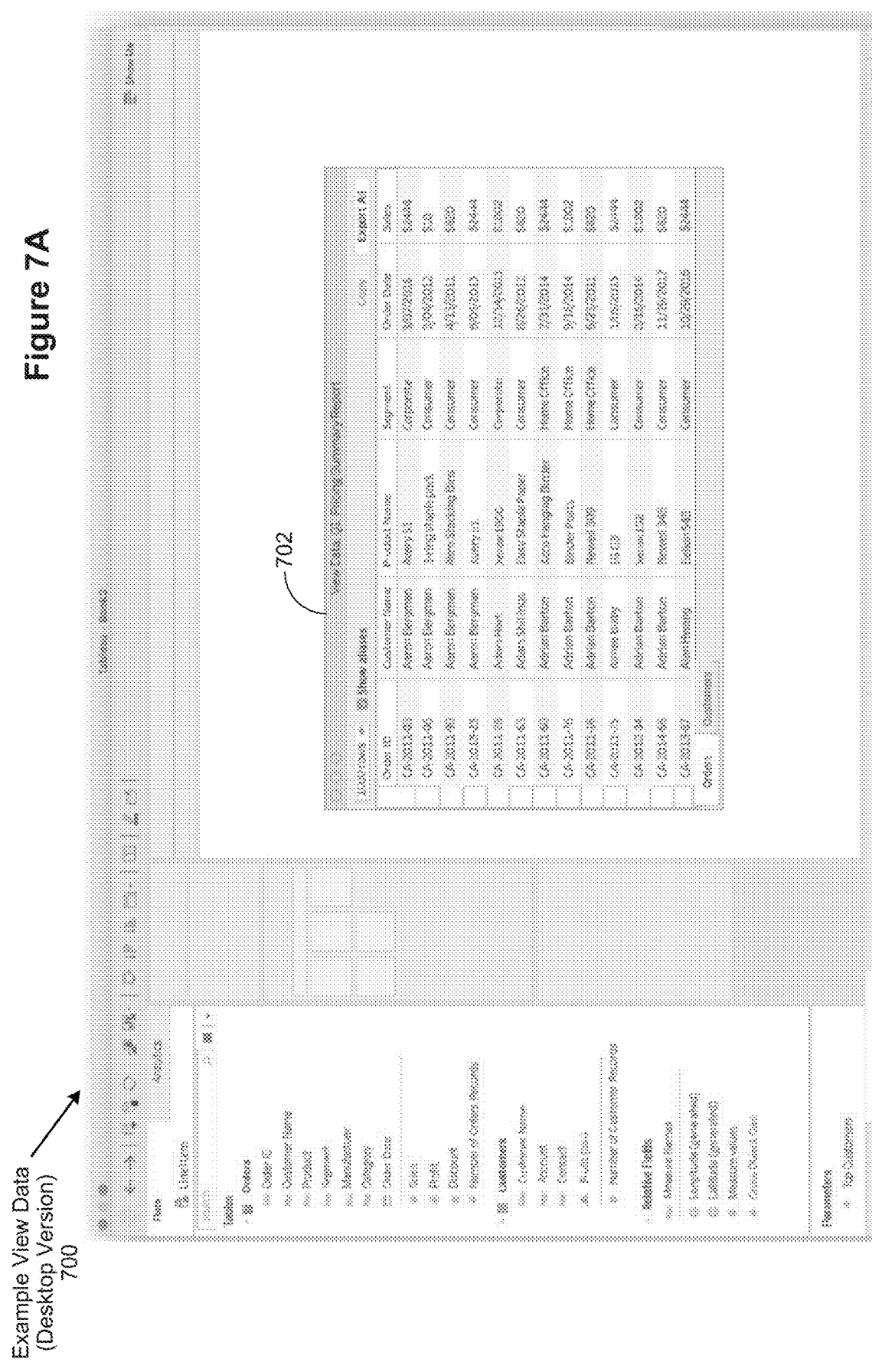

FIG. 7A shows an example graphical user interface 700 that allows a user to view data (e.g., data on orders) on a desktop, according to some implementations. The graphical user interface 700 shows a summary report 702.

Some implementations include a schema viewer to view data using a search box, and/or show details of an object in view, Some implementations delay loading of additional table until users have switched to that table. Some implementations show a context menu for an object. Some implementations show the underlying data for a selected table.

Some implementations allow a user to view data by visualization or by data marks. In some implementations, a default view shows only fields being used in a data visualization. Some implementations show all fields including all columns from tables along with other row-level calculations. In some implementations, users can change the number of rows, and this setting is persisted for all objects for the duration of the session. Some implementations query for data for all objects used in a visualization on launch. Some implementations use asynchronous query for objects in view, improving performance over time.

FIG. 7B shows an enlarged view of the summary report 702 in FIG. 7A, according to some implementations. The view shows a summary tab 704, a tab 706 for orders, and another tab 708 for customers. Some implementation include one or more affordances to copy data (e.g., using a first option 710) and/or to export data (e.g., using a second option 712). In some implementations, columns are arranged according to dimensions on rows and columns. In some implementations, columns are arranged according to dimensions on marks cards. In some implementations, columns are arranged according to measures referenced in a data visualization. In some implementations, if "Show All Fields" is selected, columns are arranged according to remaining fields in the table.

FIG. 7C shows an alternative enlarged view of the summary report 702 in FIG. 7A, according to some implementations. The view shows details of the orders tab 706. Some implementations include an affordance (e.g., a drop-down option 714) to control the number of rows to display, and/or one or more options (e.g. an option 716) to control "Show All Fields" and/or all aliases. Some implementations allow users to adjust the number of rows shown (e.g., after an initial/default number of rows, such as 1,000 rows) and/or and export, for tables, within a session. Some implementations persist the number of rows for the session.

Figure 8A:
FIG. 8A shows an example view that includes a tab for showing additional tables, according to some implementations.

FIG. 8A shows an example view 800, which includes a tab 802 for showing additional tables, according to some implementations. Some implementations allow users to see additional tables for FIXED and INCLUDE LOD expression. In some implementations, LOD expression creates a separate table using dimensionality within the expression. Some implementations show this table with dimensions within LOD along with pre-aggregated measure values. Some implementations show the dimensions used in a FIXED expression. Some implementations show dimensions in a visualization and additional dimensions for INCLUDE expressions. Some implementations do not show additional tables for EXCLUDE, because the additional table may reveal data that may already be filtered out, and/or reveal a level of detail before aggregation that can be a security risk.

FIG. 8B shows an example 804 for decomposing aggregates into components that correspond to underlying tables, according to some implementations. Some implementations decompose the aggregate, for aggregate calculations, into components and/or display one or more underlying tables (corresponding to each component). FIG. 8C shows an example graphical user interface 806 with a view of data including a tab 808 for a component table (e.g., "Actual Revenue" 808) after decomposing an aggregate calculation for the example in FIG. 8B, according to some implementations.

FIG. 8D shows an example 810 for resolving aggregation of a row-level calculation, according to some implementations. Some implementations show all rows from row-level calculations that are aggregated to a visualization LOD. FIG. 8E shows an example graphical user interface 812 with a view of data including a tab 814 that shows all rows from row-level calculations that are aggregated to the visualization LOD. In this example, the columns "Budget & Spend" 822, "Marketing Spend" 824, and "PROMOTION Budget" 826 are shown as separate columns, and each row corresponds to a respective row-level calculation. As shown in FIG. 8D, "Budget & Spend" 816 is calculated as "Market Spend" 818–"Promotion Budget" 820.

In some implementations, a user can navigate and use a screen reader on the summary view and per table tabs, and/or view data for a visualization and/or data marks on a web interface. Some implementations allow users to share data by copying and/or exporting data from each tab. In some implementations, a user can see only data available through the RLS library function ISMEMBEROF( ).

Some implementations support two or more levels of detail: for example, one for visualization-level data, and another for row-level data from table. Some implementations show additional levels of detail. Some implementations allows users to customize views (e.g., allow show/hide columns, column arrangement, sort, and persist these customized views for return views and export). Some implementations show the same user interface elements for different endpoints.

Some implementations allow users to order columns to help the users see the correct LOD by prioritizing columns in rows and columns using marks cards. Some implementations include tables for aggregated row-level calculations. Some implementations avoid a potential security vulnerability by not showing LOD expression using EXCLUDE.

Some implementations allow a user to select a mark and choose a view data option, and, in response, show a window with multiple tabs, each tab showing a grid of raw data from an underlying table.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of displaying data associated with data marks in a data visualization, comprising:

at a computer having one or more processors and memory storing one or more programs configured for execution by the one or more processors:

generating and displaying a data visualization in a data visualization user interface, according to placement of data fields, from a data source, in shelves of the user interface, wherein the data visualization comprises a plurality of visual data marks representing data from the data source;

detecting a first user input to select a visual data mark; and in response to detecting the first user input:

obtaining a data model encoding the data source as a tree of logical tables, each logical table having its own physical representation and including a respective one or more logical fields, each logical field corresponding to either a data field or a calculation that spans one or more logical tables;

identifying one or more aggregated data values for the visual data mark, each of the aggregated data values corresponding to a respective data field in the data model;

for each of the aggregated data values, retrieving a respective disaggregated set of data rows from a respective logical table, in the data model, containing the respective data field; and displaying a summary grid, with a respective tab corresponding to each of the retrieved disaggregated sets of data rows.

2. The method of claim 1, further comprising:

identifying one or more components of the data model corresponding to the visual data mark;

generating a query map that maps the one or more components to logical queries;

obtaining one or more tables by executing logical queries in the query map; and generating and displaying a data flow diagram corresponding to the visual data mark based on the one or more tables.

3. The method of claim 2, wherein the data flow diagram includes a first icon representing the visual data mark, and a second one or more icons representing the one or more tables.

4. The method of claim 3, wherein the data flow diagram further includes a third one or more icons representing one or more groupings of the one or more tables.

5. The method of claim 4, wherein the data flow diagram further includes a fourth one or more icons representing one or more operations corresponding to the one or more groupings.

6. The method of claim 2, wherein the data flow diagram includes one or more icons that progressively disclose details of the visual data mark in response to detecting one or more user input.

7. The method of claim 2, wherein the data flow diagram includes the summary grid.

8. A computer system for displaying object models for data sources, comprising:

a display;

one or more processors; and memory;

wherein the memory stores one or more programs configured for execution by the one or more processors, and the one or more programs comprise instructions for:

generating and displaying a data visualization in a data visualization user interface, according to placement of data fields, from a data source, in shelves of the user interface, wherein the data visualization comprises a plurality of visual data marks representing data from the data source;

detecting a first user input to select a visual data mark; and in response to detecting the first user input:

obtaining a data model encoding the data source as a tree of logical tables, each logical table having its own physical representation and including a respective one or more logical fields, each logical field corresponding to either a data field or a calculation that spans one or more logical tables;

identifying one or more aggregated data values for the visual data mark, each of the aggregated data values corresponding to a respective data field in the data model;

for each of the aggregated data values, retrieving a respective disaggregated set of data rows from a respective logical table, in the data model, containing the respective data field; and displaying a summary grid, with a respective tab corresponding to each of the retrieved disaggregated sets of data rows.

9. The computer system of claim 8, further comprising:

identifying one or more components of the data model corresponding to the visual data mark;

generating a query map that maps the one or more components to logical queries;

obtaining one or more tables by executing logical queries in the query map; and generating and displaying a data flow diagram corresponding to the visual data mark based on the one or more tables.

10. The computer system of claim 9, wherein the data flow diagram includes a first icon representing the visual data mark, and a second one or more icons representing the one or more tables.

11. The computer system of claim 10, wherein the data flow diagram further includes a third one or more icons representing one or more groupings of the one or more tables.

12. The computer system of claim 11, wherein the data flow diagram further includes a fourth one or more icons representing one or more operations corresponding to the one or more groupings.

13. The computer system of claim 9, wherein the data flow diagram includes one or more icons that progressively disclose details of the visual data mark in response to detecting one or more user input.

14. The computer system of claim 9, wherein the data flow diagram includes the summary grid.

15. A non-transitory computer readable storage medium storing one or more programs configured for execution by a computer system having a display, one or more processors, and memory, the one or more programs comprising instructions for:

generating and displaying a data visualization in a data visualization user interface, according to placement of data fields, from a data source, in shelves of the user interface, wherein the data visualization comprises a plurality of visual data marks representing data from the data source;

detecting a first user input to select a visual data mark; and in response to detecting the first user input:

obtaining a data model encoding the data source as a tree of logical tables, each logical table having its own physical representation and including a respective one or more logical fields, each logical field corresponding to either a data field or a calculation that spans one or more logical tables;

identifying one or more aggregated data values for the visual data mark, each of the aggregated data values corresponding to a respective data field in the data model;

for each of the aggregated data values, retrieving a respective disaggregated set of data rows from a respective logical table, in the data model, containing the respective data field; and displaying a summary grid, with a respective tab corresponding to each of the retrieved disaggregated sets of data rows.

16. The computer readable storage medium of claim 15, further comprising:

identifying one or more components of the data model corresponding to the visual data mark;

generating a query map that maps the one or more components to logical queries;

obtaining one or more tables by executing logical queries in the query map; and generating and displaying a data flow diagram corresponding to the visual data mark based on the one or more tables.

17. The computer readable storage medium of claim 16, wherein the data flow diagram includes a first icon representing the visual data mark, and a second one or more icons representing the one or more tables.

18. The computer readable storage medium of claim 17, wherein the data flow diagram further includes a third one or more icons representing one or more groupings of the one or more tables.

19. The computer readable storage medium of claim 17, wherein the data flow diagram includes one or more icons that progressively disclose details of the visual data mark in response to detecting one or more user input.

20. The computer readable storage medium of claim 17, wherein the data flow diagram includes the summary grid.

* * * * *